(No Model.)

M. WOODHULL.
JUMP SEAT CARRIAGE.

No. 426,158. Patented Apr. 22, 1890.

Witnesses
D. F. Graham
Chas. J. Welch

Inventor
Morris Woodhull
By
Caul A. Staty
Atty.

THE NORRIS PETERS CO., PHOTO-LITHO., WASHINGTON, D. C.

UNITED STATES PATENT OFFICE.

MORRIS WOODHULL, OF DAYTON, OHIO.

JUMP-SEAT CARRIAGE.

SPECIFICATION forming part of Letters Patent No. 426,158, dated April 22, 1890.

Application filed December 4, 1889. Serial No. 332,742. (No model.)

*To all whom it may concern:*

Be it known that I, MORRIS WOODHULL, a citizen of the United States, residing at Dayton, in the county of Montgomery and State of Ohio, have invented certain new and useful Improvements in Carriages, of which the following is a specification.

My invention relates especially to that class of carriages in which shifting seats are used, so that the carriage may be used either as a one or two seated vehicle.

The object of my invention is to provide means for automatically folding the seat-arms to permit the same to pass within the body of the vehicle when the seat is folded in changing from a double to a single seated vehicle.

A further object of my invention is to provide a shifting toe-piece or foot-rail to be used in connection with the shifting seats to bring the said toe-piece in a convenient position for use whether the vehicle is used for one or two seats.

My invention consists in the various constructions and combinations of parts hereinafter described, and set forth in the claims.

Figure 1:
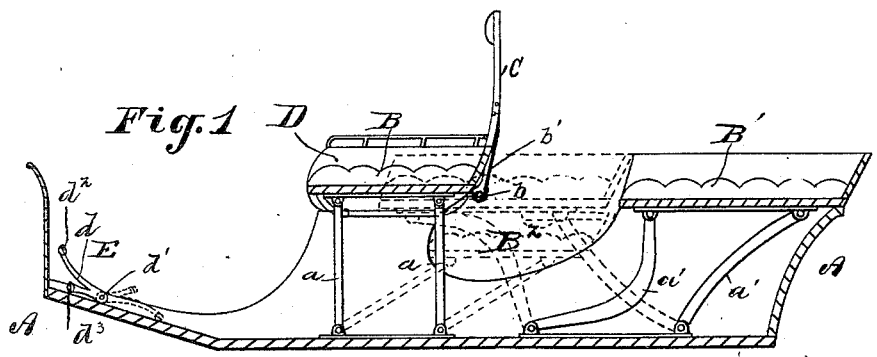
Figure 3:
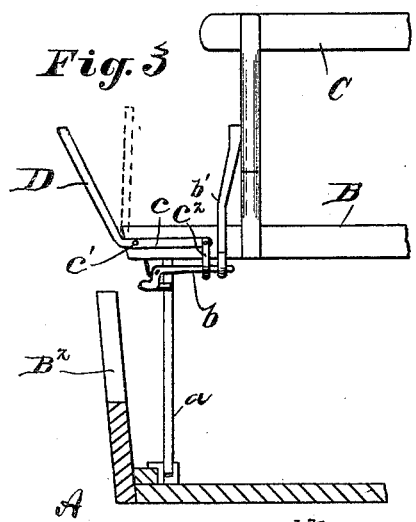
Figure 2:
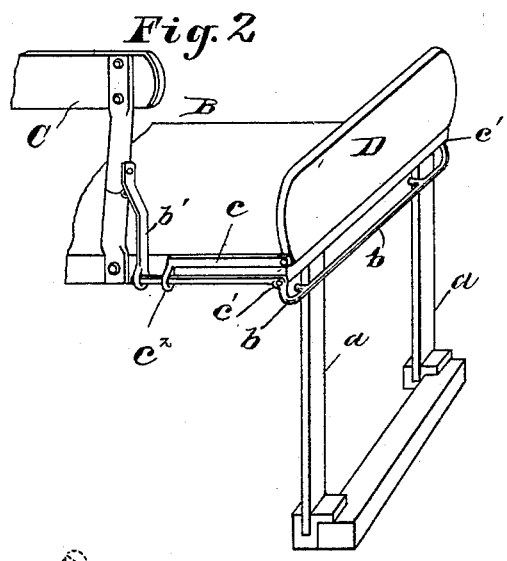
Figure 4:
Figure 5:
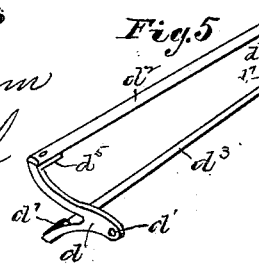

In the accompanying drawings, Figure 1 is a longitudinal sectional view of a vehicle-body to which my invention has been applied. Fig. 2 is a detailed view in perspective showing the arrangement of the folding seat-arm in connection with the locking device for the forward seat. Fig. 3 is a rear elevation, partly in section, of the same. Fig. 4 is a view, partly in section, of the toe-rail, shown in dotted lines in different positions. Fig. 5 is a perspective view of the toe-rail in detail.

Like parts are indicated by similar letters of reference throughout the several views.

In the said drawings, A A represent a vehicle-body.

B and B' are the seats, supported in the usual manner on pivoted legs $a$ $a$ $a'$ $a'$, so as to be folded, as indicated by dotted lines, to form a single-seated vehicle in a well-known manner. The forward seat B is adapted to fold under the rear seat B' when used as a single-seated vehicle. It is provided with a jointed or folding lazyback C, to which is attached the lock-lever $b$ through the medium of a connecting-rod $b'$, so that as the lazyback is folded before shifting the seats the lock-lever is withdrawn from contact with the legs $a$ $a$ to permit the seat to be folded.

In vehicles of this kind it is desirable that an opening $B^2$ be formed in the side of the vehicle-body between the front and rear seats B and B' to permit a ready ingress and egress to and from the rear seat of the vehicle when both seats are in a position for use. When, however, the vehicle is used with a single seat, it is desirable to have this opening closed. To accomplish this I provide the forward seat B at each end with a solid or closed arm D, which may be made of a single piece of wood or of a suitable frame covered with leather or in any other desirable manner. This arm D in its normal position projects outwardly slightly beyond the side of the vehicle-body, preferably at an angle, as shown in Fig. 3. To provide for drawing this arm in slightly before the seat is folded, I construct the said arm with an inwardly-projecting lever $c$ and pivot the said arm at each end, as shown at $c'$. The lever $c$ is extended inwardly and is connected to the lock-lever $b$ by a suitable connecting-piece $c^2$, so that as the lock-lever is moved by the movement of the lazyback the arm D is drawn inwardly, as indicated by dotted lines in Fig. 3, so as to come within the vehicle-body and in a suitable position for closing the opening $B^2$ when the seat is folded.

When a vehicle of this kind is used with a single seat, the seat stands slightly back of the position of the forward seat when used as a two-seated vehicle. The toe-rest when placed stationary in the vehicle, therefore, if in the proper position in one instance is too far from or too close to the seat in the other position. To overcome this difficulty I provide a hinged toe-rest E, pivoted at either side of the vehicle-body and adapted to turn, as indicated in dotted lines, so as to bring the rail in a convenient position at the proper distance from the seat whether one or two seats are used. This toe-rest is preferably formed by using two forked side pieces $d$, pivoted at $d'$ to the side of the vehicle and provided with longitudinal connecting-pieces $d^2$ $d^3$, preferably of half-round iron, one of which is adapted to form a toe-rail in either position of adjustment.

The side pieces $d$ are each provided with laterally-projecting lugs $d^5$ and $d^7$, to which the rails $d^2$ $d^3$ are attached. These lugs are so formed that the rails $d^2$ $d^3$ are attached thereto on opposite sides, so that the projecting lugs $d^5$ and $d^7$ are on the under side of that rail which is brought into position for use, the other rail being adapted to rest on the bottom of the vehicle and form a brace and support to bring the rail in use to the proper position.

I have shown the arm-lever $c$ connected to the lock-lever $b$ and adapted to receive its motion therefrom when the lazyback is moved. It is obvious, however, that the connection may be made direct to the lazyback without the intervention of the lock-lever, which may be otherwise connected or operated. In other words, the lock-lever may or may not be used with the automatically-folding arm; but the constructions illustrated in the drawings are the preferable ones.

Having thus described my invention, I claim—

1. In a vehicle having the shifting seats, as described, a pivoted toe-rest having two projecting toe-rails, said toe-rest being located in front of the forward shifting seat and adapted to be turned to different positions of adjustment about its pivotal center to bring the different toe-rails in position for use, substantially as specified.

2. The combination, with a shifting-seated vehicle having a side opening in the vehicle-body, of a hinged solid arm on the folding seat of substantially the same size and shape as said opening, said arm being adapted when the seat is folded to come opposite to and close said opening, a locking device independent of said arm for holding said seat in its normal position, and a connection from said arm to said locking device, whereby said arm is caused to fold inwardly, so as to close said opening when the seat is folded, substantially as specified.

3. The combination, with a shifting-seated vehicle having a side opening in the vehicle-body, of a hinged solid arm adapted to come opposite to and close said opening when the seat is folded and a locking-lever independent of said arm adapted to be operated by the folding of the lazyback of said seat, an inwardly-extending lever $c$ on said hinged arm, and a connecting-piece $c^2$ between said locking-lever and arm-lever, substantially as specified.

4. In a vehicle having one or more folding seats, as described, a hinged toe-rest consisting of the forked side pieces and the longitudinal connecting-rails connecting the extremities of said forked side pieces, the said side pieces and connecting-rails being so arranged that one of said rails lies along the bottom of the vehicle when the other rail is in position for use, substantially as specified.

5. In a vehicle, an adjustable toe-rest consisting of the forked side pieces having the inwardly-projecting lugs and the connecting-rails secured to the respective lugs on opposite sides, substantially as specified.

6. The combination, with a folding seat having the locking device adapted to hold said seat in a normal position, of a hinged arm attached to said locking device, a pivoted connection from said locking device to a lazyback on said folding seat, and a hinged toe-rest adapted to be adjusted in different positions to correspond to the different positions of said folding seat, substantially as specified.

In testimony whereof I have hereunto set my hand this 19th day of November, A. D. 1889.

MORRIS WOODHULL.

Witnesses:
LON CONOVER,
J. C. TYSON.